United States Patent
Long et al.

(10) Patent No.: US 10,959,817 B2
(45) Date of Patent: Mar. 30, 2021

(54) DENTAL MODEL HOLDING SYSTEM

(71) Applicant: SDC U.S SmilePay SPV, Nashville, TN (US)

(72) Inventors: Josh Long, Nashville, TN (US); Christopher Yancey, Nashville, TN (US); Roland Harris, Nashville, TN (US); Chris Sorrells, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 16/540,276

(22) Filed: Aug. 14, 2019

(65) Prior Publication Data

US 2021/0045855 A1    Feb. 18, 2021

(51) Int. Cl.
*A61C 13/12* (2006.01)
*A61C 7/08* (2006.01)
*A61C 13/34* (2006.01)

(52) U.S. Cl.
CPC ............. *A61C 13/12* (2013.01); *A61C 7/08* (2013.01); *A61C 13/34* (2013.01)

(58) Field of Classification Search
CPC ............ A61C 13/12; A61C 13/34; A61C 7/08
USPC ..................................................... 433/51
See application file for complete search history.

(56) References Cited

U.S. PATENT DOCUMENTS

| | | | |
|---|---|---|---|
| 1,001,038 A | | 8/1911 | Janich |
| 3,307,222 A | * | 3/1967 | Baldwin ............... A61C 13/06 425/177 |
| 5,356,291 A | * | 10/1994 | Darnell ............... A61C 19/063 433/216 |
| 5,575,655 A | * | 11/1996 | Darnell ............... A61C 19/063 433/216 |
| 5,667,386 A | * | 9/1997 | Black ............... A61C 13/0024 425/504 |

(Continued)

FOREIGN PATENT DOCUMENTS

| | | |
|---|---|---|
| KR | 101722360 | 3/2017 |
| WO | WO-2013/169054 | 11/2013 |

(Continued)

OTHER PUBLICATIONS

International Search Report and Written Opinion on International Application No. PCT/US2020/046154, dated Nov. 2, 2020, 9 pages.

*Primary Examiner* — Matthew M Nelson
(74) *Attorney, Agent, or Firm* — Foley & Lardner LLP (57) ABSTRACT

A fixture plate includes a base having a contact face configured to support a dental model having a model identifier on a bottom surface. A bore extends through the base to one or more channels formed in the contact face and that extend from the bore. A viewing port extends through the base and has a transparent material inserted therein to seal the viewing port at the contact face. The viewing port and the transparent material enable the model identifier to be accessed from underneath the contact face when the dental model is on the contact face. A protrusion extends from the contact face and is configured to interface with an aperture of the dental model to retain the dental model in a specific orientation. The channels are configured to provide a suction force applied through the bore to hold the dental model against the contact face.

16 Claims, 5 Drawing Sheets

(56) References Cited

U.S. PATENT DOCUMENTS

| | | | |
|---|---|---|---|
| 5,829,980 A * | 11/1998 | Sheridan | A61C 7/00 433/213 |
| 6,077,075 A * | 6/2000 | Bedard | A61C 13/04 264/18 |
| 6,200,135 B1 | 3/2001 | Hultgren | |
| 6,769,912 B2 | 8/2004 | Beuschel et al. | |
| 7,178,731 B2 | 2/2007 | Basler | |
| 7,349,130 B2 | 3/2008 | Vadnais et al. | |
| 7,454,843 B2 | 11/2008 | Matsuda et al. | |
| 7,714,249 B2 | 5/2010 | Nomaru | |
| 8,491,306 B2 | 7/2013 | Raby et al. | |
| 8,740,614 B2 | 6/2014 | Wen et al. | |
| 8,926,328 B2 | 1/2015 | Suttin | |
| 9,265,592 B2 | 2/2016 | Koch | |
| 9,378,308 B2 | 6/2016 | Pieper | |
| 9,456,882 B2 | 10/2016 | Huffman | |
| 9,511,425 B1 | 12/2016 | Luksch et al. | |
| 9,844,426 B2 | 12/2017 | Atiya et al. | |
| 2001/0019817 A1 * | 9/2001 | Darnell | A61C 19/066 433/216 |
| 2005/0011885 A1 * | 1/2005 | Seghatol | A61L 2/12 219/679 |
| 2006/0134580 A1 * | 6/2006 | Raby | A61C 9/0006 433/213 |
| 2008/0141534 A1 | 6/2008 | Hilliard | |
| 2010/0327472 A1 * | 12/2010 | Anderson | A63B 71/085 264/16 |
| 2012/0295212 A1 * | 11/2012 | Sakimura | A61C 19/066 433/6 |
| 2017/0144360 A1 * | 5/2017 | Moore, III | B29C 51/10 |
| 2017/0265967 A1 * | 9/2017 | Hong | A61C 7/002 |
| 2018/0263730 A1 | 9/2018 | Sirovskiy et al. | |
| 2018/0311018 A1 | 11/2018 | Saito et al. | |
| 2018/0333226 A1 * | 11/2018 | Tsai | B29C 51/46 |
| 2019/0046305 A1 | 2/2019 | Gebhardt et al. | |
| 2019/0107932 A1 | 4/2019 | Wen et al. | |

FOREIGN PATENT DOCUMENTS

| | | |
|---|---|---|
| WO | WO-2018/044145 A1 | 3/2018 |
| WO | WO-2018/162657 A1 | 9/2018 |
| WO | WO-2018/174843 A1 | 9/2018 |
| WO | WO-2018/234310 A1 | 12/2018 |
| WO | WO-2019/029791 A1 | 2/2019 |
| WO | WO-2019/054829 | 3/2019 |

* cited by examiner

DENTAL MODEL HOLDING SYSTEM

BACKGROUND

The present disclosure relates generally to manufacturing dental appliances. More specifically, the present disclosure relates to a system for holding dental models during manufacturing of dental appliances, such as dental aligners for repositioning teeth of a user.

Dental aligners may be worn by a user receiving orthodontic treatment. Some dental aligners are fabricated by thermoforming material to a dental model. After thermoforming the material to a dental model, the material can be marked and the formed aligner cut and removed from the dental model. The dental model with the thermoformed material should be securely retained to ensure that components of a manufacturing system accurately interact with the dental model and the material thermoformed thereon.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a fixture plate. The fixture plate includes a base having a first surface and a second surface opposite the first surface. The second surface is a contact face configured to support a dental model having a model identifier on a bottom surface. The fixture plate includes a bore extending through the base from a first opening in the first surface to a second opening in the second surface. The first surface is in fluid communication with the second surface by the bore. The fixture plate includes one or more channels formed in the contact face and extending from the second opening. The fixture plate includes a viewing port extending through the base from the first surface to the second surface and having a transparent material inserted therein to seal the viewing port at the contact face. The viewing port and the transparent material enable the model identifier to be accessed from underneath the contact face when the dental model is positioned on the contact face. The fixture plate includes a protrusion extending from the contact face and being configured to interface with an aperture of the dental model to retain the dental model in a specific orientation on the contact face. The one or more channels are configured to provide a suction force applied through the bore to hold the dental model against the contact face.

Another implementation of the present disclosure includes a system having a fixture plate configured to support a dental model having a material formed thereon and a model identifier on a bottom surface of the dental model. The fixture plate includes a base having a first surface and a second surface opposite the first surface. The second surface is a contact face configured to support the dental model. The fixture plate includes a bore extending through the base from a first opening in the first surface to a second opening in the second surface. The first surface is in fluid communication with the second surface by the bore. The fixture plate includes one or more channels formed in the contact face and extending from the second opening. The fixture plate includes a viewing port extending through the base from the first surface to the second surface and having a transparent material inserted therein to seal the viewing port at the contact face. The viewing port and the transparent material enable the model identifier to be accessed from underneath the contact face when the dental model is positioned on the contact face. The fixture plate includes a first protrusion extending from the second surface of the base and for interfacing with a first aperture disposed on the dental model. The fixture plate includes a second protrusion extending from an insert positioned within a cavity formed in the contact surface. The second protrusion is configured to interface with a second aperture of the dental model. The first protrusion and the second protrusion are configured to retain the dental model in a specific orientation on the contact face and the one or more channels are configured to provide a suction force applied through the bore to hold the dental model against the contact face.

Another implementation of the present disclosure includes a fixture plate. The fixture plate includes a base having a contact face configured to support a dental model having a material formed thereon. The material includes an aligner material portion and an excess material portion. The fixture plate includes one or more channels formed in the contact face. The fixture plate includes a bore extending through the base from a bottom opening to the contact face. A portion of the bore located along the bottom opening is configured to couple with a hose of a vacuum system configured to generate a suction force at the contact surface via the one or more channels. The suction force is applied to the dental model and the excess material portion to retain the dental model and the material formed thereon against the contact surface.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and apparatuses for positioning dental models. A fixture plate is configured to retain dental models such that components of a manufacturing system can accurately interact with the dental model and material thermoformed to the dental model. For example, when used with a laser cutting system or CNC milling cutting system, the fixture plate can secure the dental model with material thermoformed thereon so that excess material can be trimmed from the dental model to produce a dental aligner. The fixture plate includes components configured to interface with specific complimentary components of dental models to facilitate retention of the dental model. The fixture plate also includes components configured to provide a retention (such as a suction or vacuum) force between the fixture plate and the dental model to maintain the position of the dental model on the fixture plate. The fixture plates can be used in any machine or component of a dental aligner manufacturing system, such as a thermoforming system, a marking system, a cutting system, among others.

Figure 1:
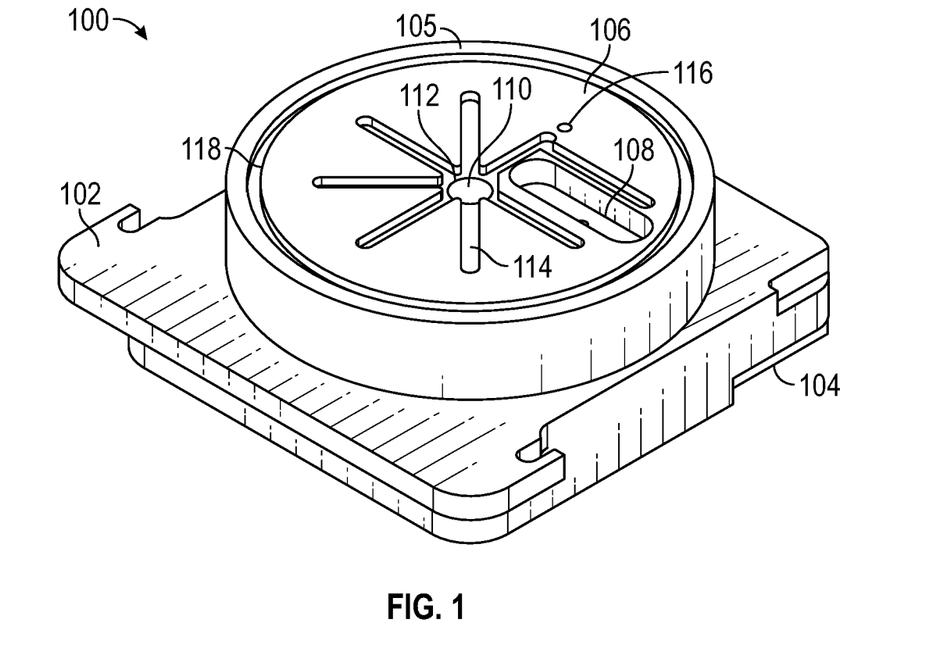
FIG. 1 is an illustration of a fixture plate for retaining a dental model, according to an illustrative embodiment.
Figure 2:
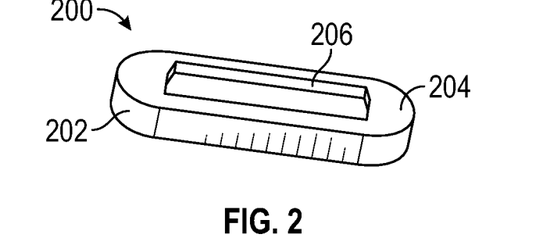
FIG. 2 is an illustration of an insert positionable in the fixture plate of FIG. 1, according to an illustrative embodiment.
Figure 3:
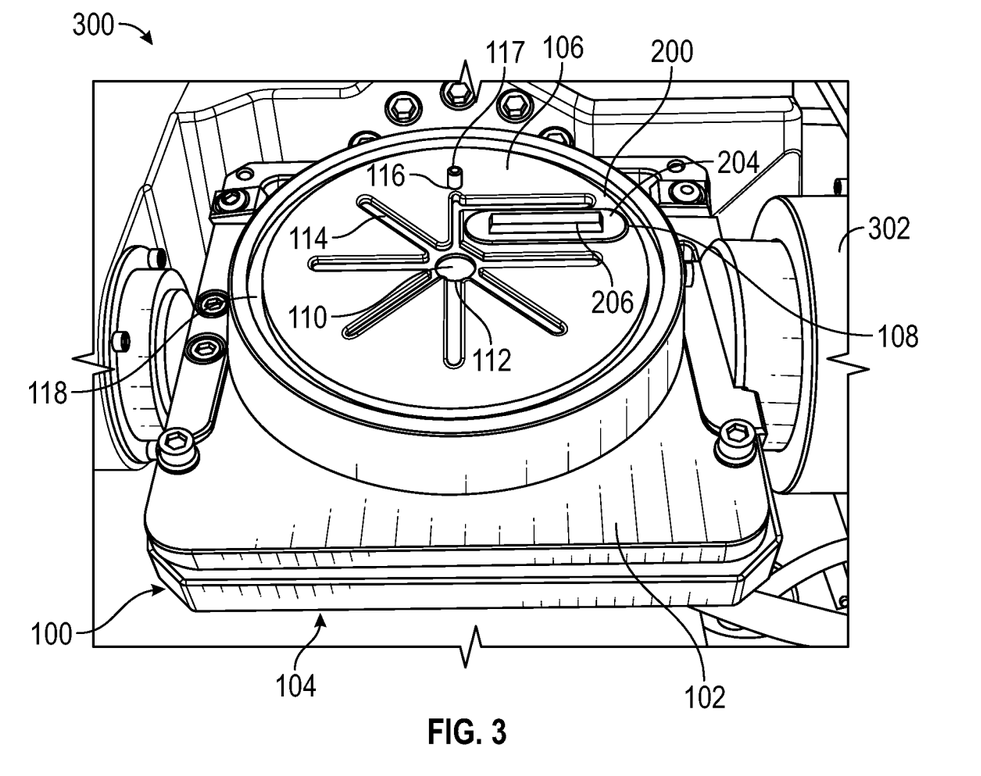
FIG. 3 is an illustration of a positioning system for use with the fixture plate of FIG. 1, according to an illustrative embodiment.
Figure 4:
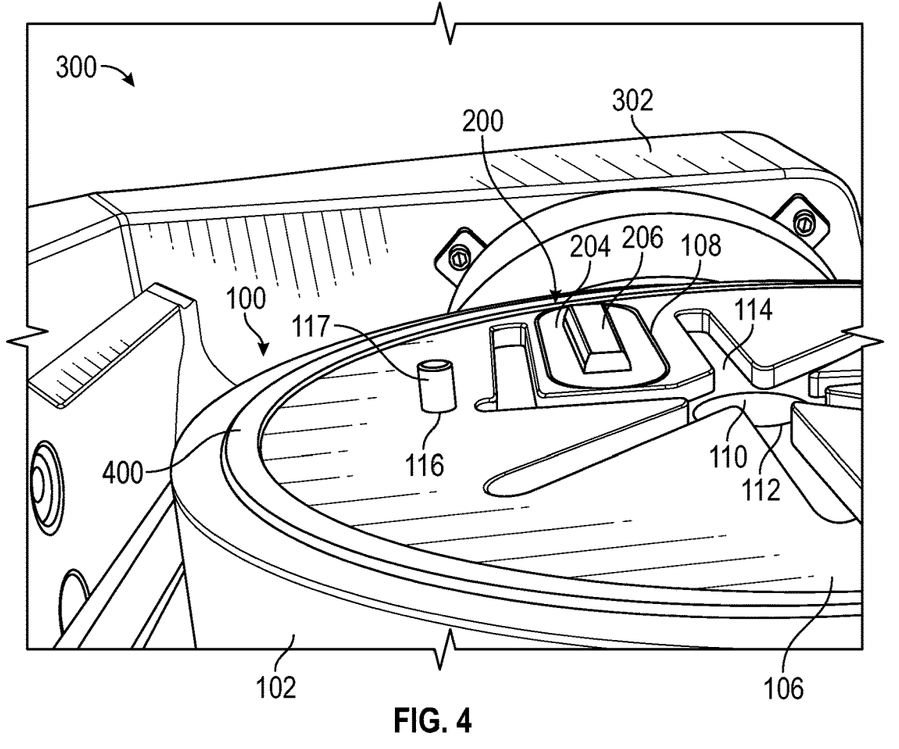
FIG. 4 is an illustration of a side view of the positioning system of FIG. 3, according to an illustrative embodiment.

Referring now to FIGS. 1-4, various embodiments of a fixture plate 100 for retaining dental models 502 are shown. Specifically, FIG. 1 is an illustration of a fixture plate 100 for retaining a dental model 502, FIG. 2 is an illustration of an insert positionable in the fixture plate 100, FIG. 3 is an illustration of a positioning system 300 for use with the fixture plate 100, and FIG. 4 is an illustration of a side view of the positioning system 300. The fixture plate 100 may operate in conjunction with other components and/or systems, and may also be configured to have additional and/or alternative components as shown in the figures and later described. The fixture plate 100 is shown to include a base 102 having a bottom surface 104 and an upper surface 105 defining a contact face 106. The bottom surface 104 is configured to interface and function cooperatively with one or more other systems, which may include, for example, a negative pressure (or vacuum) system. The contact face 106 is configured to interface with a dental model 502. In some embodiments, the base 102 may be arranged to accommodate coupling or other interfacing with additional components or systems to facilitate cooperation therewith, such as a marking system, or a cutting system, among others.

As shown in FIG. 1 and FIG. 2, the contact face 106 includes a cavity 108 configured to receive the insert 200. The cavity 108 is shown to be arranged adjacent a plurality of channels 114 on the contact face 106. The cavity 108 is further configured to receive the insert 200 such that the insert 200 may be positioned within the cavity 108 and may also be removed from the cavity 108. The insert 200 also includes a feature configured to interface with a complimentary feature of the dental model 502. The insert 200 is shown to include a body 202. The body 202 is configured to occupy the cavity 108 of the contact face 106 such that the body 202 of the insert 200 sits within and is contained in the cavity 108. The body 202 is shown to include an upper surface 204 configured to sit level or substantially level with the upper surface 105 when the body 202 of the insert 200 occupies the cavity 108. The insert 200 is also shown to include a notch 206 extending from the upper surface 204 of the insert 200. The cavity 108 accommodates removal of the insert 200 to facilitate de-coupling of the dental model 502 from the fixture plate 100. In some embodiments, the cavity 108 may be arranged at various locations about the contact face 106 to accommodate different dental models 502 and corresponding complimentary interfacing components of dental models 502. Similarly, the cavity 108 may also be configured to have alternate geometries to accommodate various inserts, and various dental models 502 having corresponding complimentary interfacing features.

Referring now to FIG. 3 and FIG. 4, the insert 200 is positioned within the cavity 108. The insert 200 may be selectively removable from the cavity 108. The body 202 is shown to occupy the cavity 108 of the contact face 106 such that the upper surface 204 of the body 202 is positioned level or substantially level with the upper surface 105 of the fixture plate 100. With the insert 200 positioned within the cavity 108 of the contact face 106, the notch 206 extends upwardly from the upper surface 105 such that the notch 206 may interface with corresponding complimentary components of the dental model 502.

Figure 5:
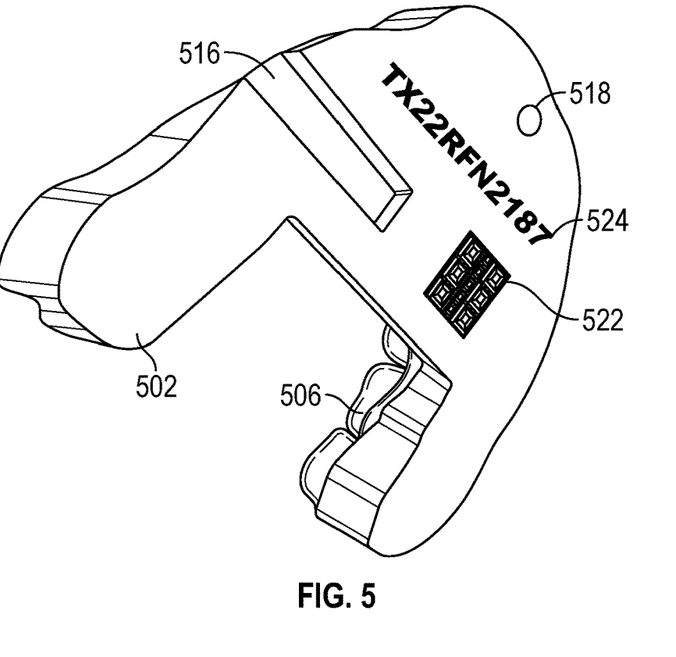
FIG. 5 is an illustration of a bottom view of a dental model, according to an illustrative embodiment.
Figure 6:
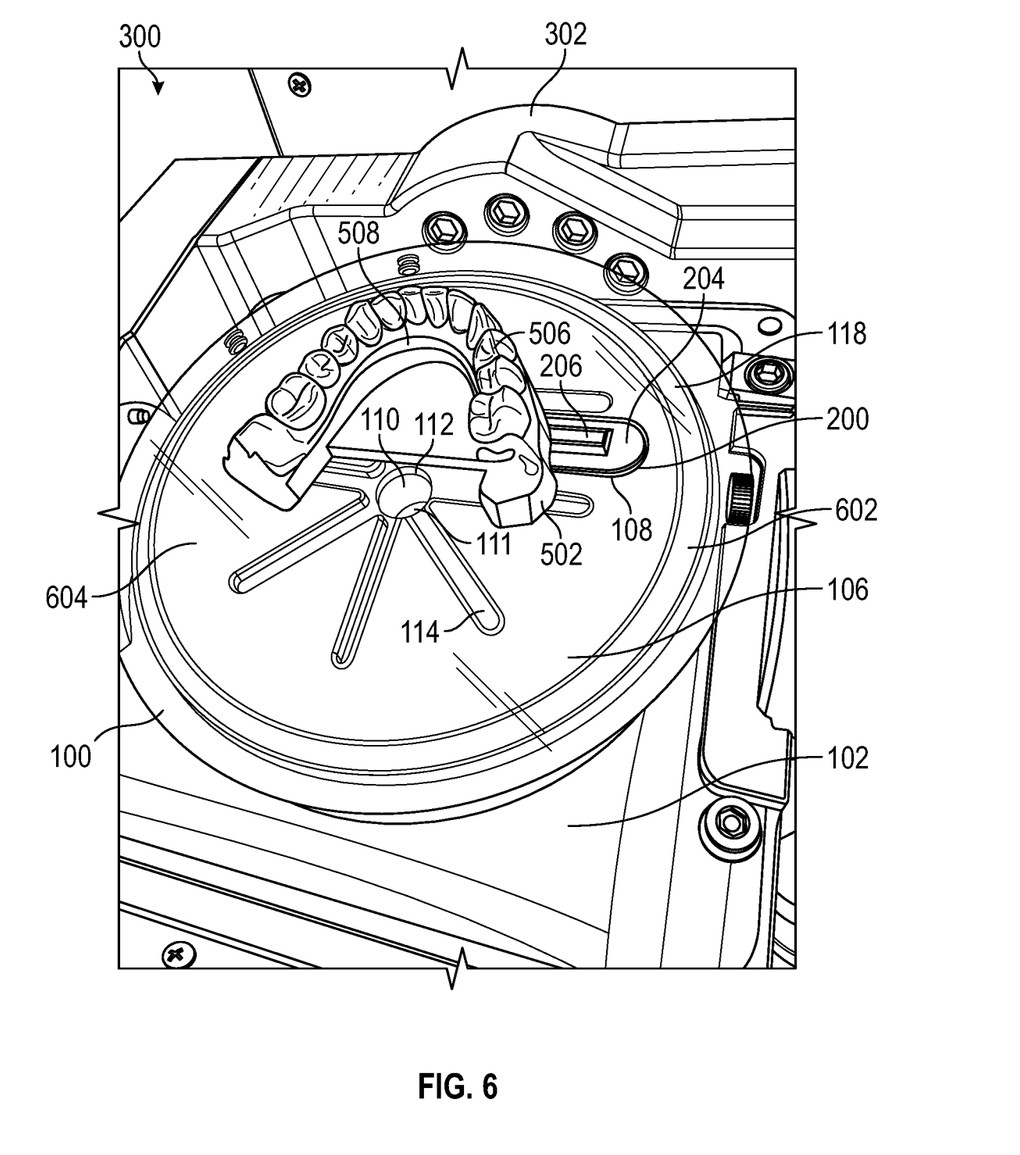
FIG. 6 is an illustration of the positioning system of FIG. 3 including the fixture plate of FIG. 1 retaining a dental model, according to an illustrative embodiment.

Referring now to FIG. 5 and FIG. 6, a bottom view of the dental model 502 and a top view of the dental model 502 retained on the fixture plate 100 are shown. The dental model 502 includes a dental arch portion 508 corresponding to a dental arch of the user. The dental arch portion 508 comprises a plurality of teeth portions 506 corresponding to teeth of the user. The dental model 502 may be configured to be retained by complimentary components of the fixture plate 100 interfacing with and thus retaining the dental model 502, as described in greater detail below. The dental model 502 is positioned on the fixture plate 100 with the dental arch portion 508 facing away from the upper surface 105 of the fixture plate 100.

The dental model 502 includes a recess 516. In some embodiments, the recess 516 may be configured as a groove, though the recess 516 may have other possible geometries. The recess 516 is configured to accommodate the notch 206 of the insert 200. For example, the recess 516 is configured to receive and engage with the notch 206 of the insert 200 to provide retention and/or coupling means with respect to the insert 200, and correspondingly with the fixture plate 100, when the recess 516 of the dental model 502 is positioned to receive the notch 206.

The dental model 502 includes a model identifier 522 and/or model identification code 524. The model identifier 522 may be or include a data matrix, such as a QR code, or an alphanumeric code as shown in the embodiment of FIG. 5, though other types of model identifiers 522 and/or model identification codes 524 may be included in or on the dental model 502 for identifying the dental model 502. The model identifier 522 and model identification code 524 may include information or data corresponding to the dental model 502. For instance, the model identifier 522 may be encoded to include data which identifies the dental model 502. Similarly, the model identification code 524 may be an alphanumeric code which identifies the dental model 502. A system, sensor, component, or other device may be configured to parse the model identifier 522 and/or model identification code 524 to extract the data identifying the dental model 502, and select a trim line for cutting the thermoforming material from the dental model 502 based on the data to prepare a dental aligner for use.

Referring now generally to the figures, the fixture plate 100 is shown to include an aperture 116 arranged on the contact face 106 (e.g., extending into the base 102). The aperture 116 is configured to accommodate a protrusion 117 that extends from the aperture 116 and interfaces with a corresponding aperture 518 of the dental model 502 to provide retention of the dental model 502. In some embodiments, the aperture 116 may be configured such that the protrusion 117 may be removed to facilitate de-coupling of the dental model 502 from the fixture plate 100. Similar to the cavity 108, the aperture 116 may be positioned variously about the contact face 106 to accommodate various dental models and corresponding interfacing components. Additionally, the aperture 116 may vary in geometry to accommodate protrusions of varying corresponding geometries configured to interface with various complimentary components of various dental models 502.

FIG. 3 shows the protrusion 117 positioned in the aperture 116 such that the protrusion 117 extends outwardly from the upper surface 105. In some embodiments, the protrusion 117 may be a pin extending outwardly from the upper surface 105 (e.g., at a 90° angle), with the pin sized to fit in the aperture 116. The protrusion 117 is configured to interface with a corresponding complementary aperture 518 of the dental model 502. When the protrusion 117 is positioned in the aperture 116 of the contact face 106, the dental model 502 can be positioned on the contact face 106 of the fixture plate 100 with the protrusion 117 positioned within (e.g., and extending into) the complementary aperture 518 of the dental model 502. As such, the protrusion 117 may be configured to assist in the positioning of the dental model 502 relative to the upper surface 105. The protrusion 117 may occupy at least a portion of the complementary aperture 518 to provide a retention and/or coupling mechanism (e.g., in conjunction with the insert 200) between the fixture plate 100 and the dental model 502.

While the protrusion 117 and insert 200 are described as being able to retain and couple the dental model 502 to the fixture plate 100, it should be understood that alternative features may be used for retaining a position of the dental model 502 relative to the fixture plate 100, such as additional inserts 200, additional protrusions 117, inserts having different features such as wedges and corresponding channels, and so on.

The fixture plate 100 is shown to include a bore 110 extending through the base 102 from the upper surface 105 to the bottom surface 104. The bore 110 may provide fluid communication between the contact face 106 and the bottom surface 104 (e.g., to provide fluid flow from the contact face 106 through the bore 110). The bore 110 includes a first opening 111 arranged on the bottom surface 104 and a second opening 112 arranged on the contact face 106. In some embodiments, the first opening 111 of the bore 110 on the bottom surface 104 is configured to accommodate components of other systems, such as a hose and corresponding coupling, and provide an airtight seal between the hose and the first opening 111 of the bore 110 (e.g., to prevent any loss of pressure at the first opening 111). In some embodiments, the base 102 may be rotatably coupled to a hose of a vacuum, pump, or other possible vacuum system. The base 102 may be rotatably coupled to the hose such that the fixture plate 100 is configured to rotate 360°. As such, through use of a single hose, the fixture plate 100 may have a greater range of motion than where two or more hoses are coupled to the fixture plate 100 (as multiple hoses may cause tangling of the hoses as the fixture plate 100 is rotated). The hose is configured to draw air from the contact face 106, through the bore 110 in fluid communication with both the contact face 106 and the bottom surface 104, toward the bottom surface 104. Such an air movement creates a suction force on and along the contact face 106. A vacuum system attached to the first opening 111 (e.g., via the hose and coupling) can provide the suction force by drawing the dental model 502 and any excess material thermoformed thereon toward the contact face 106, sealing the dental model 502 and any excess material thermoformed thereon to the contact face 106, and drawing air out of the sealed space between the dental model 502 and any excess material thermoformed thereon and the fixture plate 100 (e.g., with little to no losses in pressure or suction force due to the connection of the hose at the first opening 111).

Figure 7:
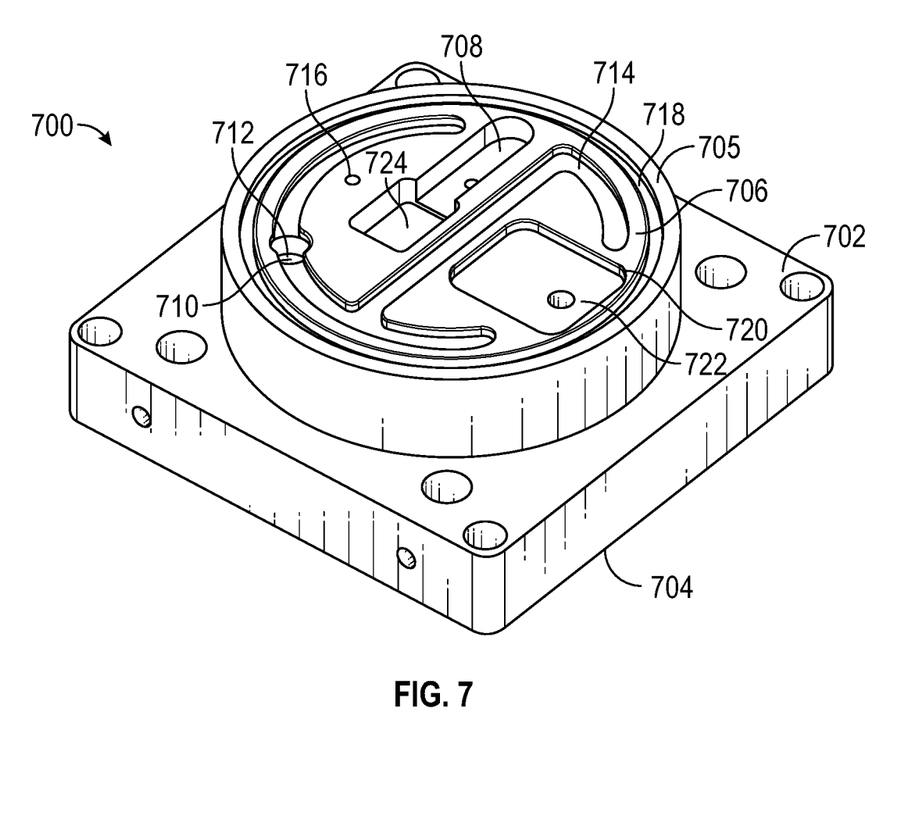
FIG. 7 is an illustration of another embodiment of a fixture plate for retaining a dental model, according to an illustrative embodiment.

The contact face 106 is further shown to include a plurality of channels 114 extending radially from the second opening 112 of the bore 110. The plurality of channels 114 may provide fluid communication from the bottom surface 104 (e.g., via the bore 110) along the contact face 105. While shown as extending radially from the bore 110, in some implementations, the plurality of channels 114 may be configured differently than that shown on the contact face 106 in FIG. 1. For example, the plurality of channels 114 may be configured to extend from the second opening 112 and along the contact face 106 in various directions providing fluid communication between the bottom surface 104 and different portions of the contact face 106. In some embodiments, the plurality of channels 114 may be arranged radially as shown, or may be arranged in concentric circles, spirals, C-shaped configurations (such as shown in FIG. 7), or other arrangements about the contact face 106. Additionally, the plurality of channels 114 may be formed to have various depths and/or widths that may be consistent or vary about the contact face 106.

The contact face 106 is shown to include a channel 118 sized to fit an O-ring 400 arranged along or proximate the outer edge of the contact face 106. The O-ring 400 is configured to provide a seal for a portion of the contact face 106. In some embodiments, the O-ring 400 is arranged along an edge of the contact face 106 of the fixture plate 100. The O-ring 400 may be constructed of a rubber, plastic, resin, or other polymeric material. In some embodiments, the O-ring 400 may be pliable. The O-ring 400 is shown to be in contact with the contact face 106 of the fixture plate 100 as seen in FIG. 4. In some embodiments, the O-ring 400 may be secured to the contact face 106 with an adhesive and/or other securing means (e.g., within the channel 118). In some embodiments, the O-ring 400 may be fit into the channel 118 of the contact face 106. The O-ring 400 is arranged about the contact face 106 such that it is disposed between (and separates) the edge of the contact face 106 and other components of contact face 106 (e.g., the cavity 108, the aperture 116, the protrusion 117, the plurality of channels 114, the bore 110, etc.). The O-ring 400 may separate the portion to be sealed (e.g., inside of a perimeter defined by the O-ring 400) from other portions of the contact face 106. When a dental model 502 having material 602 thermoformed thereto is positioned on the contact face 106 of the fixture plate 100 (e.g., with the dental model 502 engaging the notch 206 of the insert 200 and protrusion 117), the dental model 502 and material 602 may be positioned to cover at least the portion of the contact face 106 encompassed by and including the O-ring 400. Thus, the O-ring 400 may be configured to provide a seal between the portion of the contact face 106 encompassed by and including the O-ring 400 and the dental model 502 and thermoformed material 602. However, as shown in FIG. 6, the material 602 thermoformed to the dental model 502 can also exceed the size of the dental model 502, the area of the plurality of channels 114, the diameter of the O-ring 400, and even the diameter of the fixture plate 100.

As shown in FIG. 3, the positioning system 300 includes a fixture stage 302. In operation, the fixture stage 302 may be coupled to the base 102 of the fixture plate 100 such that the contact face 106 of the fixture plate 100 faces outwardly with respect to the fixture stage 302 (e.g., whereby the upper surface 105 of the fixture plate 100 is exposed to a cutting system for cutting excess material 602 from the dental model 502). In some implementations, the fixture stage 302 may be operatively connected to one or more rotary or linear stages which can rotate, pivot, lift, translate, or otherwise move the fixture stage 302 and thereby move the fixture plate 100. As the fixture stage 302 is moved, a laser of a laser cutting system or a milling tool of a CNC milling system may cut and/or trim material 602 formed over the dental model 502 to produce a dental aligner. The fixture stage 302 may include various components or stages configured to lift, rotate, pivot, or otherwise move the fixture plate 100 (e.g., with respect to a cutting instrument, such as a laser or milling tool). The dental model 502 is coupled to the fixture plate 100 while the fixture stage 302 moves the fixture plate 100. Although not shown in the embodiment of FIG. 3, the positioning system 300 may include additional components configured to interface with and/or couple to the bottom surface 104 of the fixture plate 100. For example, the system 300 may include a vacuum system configured to provide a suction force to retain the dental model 502 against the fixture plate 100 using seals formed between the fixture plate 100 and the dental model 502 (e.g., including thermoformed material 602 of the dental model 502) as well as between a hose of the vacuum system and the base 102.

As shown in FIG. 6, the fixture stage 302 is coupled to the fixture plate 100 such that the cutting system faces the dental model 502, which includes a material 602 thermoformed thereto. The material 602 may be constructed from a plastic, resin, or polymeric material configured to be thermoformed or otherwise take the shape of the dental model 502. The material 602 may be thermoformed to the dental model 502 (e.g., by heating the material 602, positioning the heated material 602 along the teeth portion of the dental model 502, and removing air between the dental model 502 and heated material 602 such that the heated material 602 is formed to the dental model 502). The excess material 602 may be arranged along the contact face 106 of the fixture plate 100. The excess material 602 is shown to contact the O-ring 400 to create a seal and an airtight volume 604 between the material 602 and the O-ring 400. Accordingly, application of negative pressure (e.g., suction pressure) by a vacuum system to the airtight volume 604 provides a force aiding in retention and/or coupling of the dental model 502 to the fixture plate 100 during movement of the fixture plate 100.

The dental model 502 is positioned on the fixture plate 100 such that a recess 516 of the dental model 502 receives the notch 206 extending from the upper surface 204 of the insert 200, which is positioned within the cavity 512. Accordingly, the upper surface 204 of the insert 200 is level with the upper surface 510 of the fixture plate 100 such that the notch 206 extending from the insert 200 interfaces with (e.g., fit into) the recess 516 of the dental model 502. The notch 206 and recess 516 may have a complementary geometry. In some embodiments, the notch 206 can have a bar configuration configured to interface with a groove having complimentary dimensions to the bar. Additionally, the protrusion 117 is at least partially received by the aperture 218 of the dental model. In some embodiments, the protrusion 117 can have a pin configuration configured to interface with a pinhole arranged on the dental model 502. Collectively, the interface between the notch 206 of the insert 200 and the recess 516 and the interface between the protrusion 117 and the aperture 218 aid the retention of the dental model 502 to the fixture plate 100. The dental model 502 is further retained by the fixture plate 100 using one or more retaining mechanisms including a vacuum system in fluid communication with the airtight volume 604 via the bore 110 and channels 114. Retention provided through the previously described features enables the fixture plate 100 to be positioned, moved, adjusted, and otherwise manipulated by the fixture stage 302 and/or other systems, such as the laser cutting system or CNC milling system. Such movement of the fixture plate 100 while retaining the dental model 502 provides for the material 602 to be cut from the dental model 502 more precisely and at greater speed than if the material 602 were cut from a stationary position. The material 602 is cut from the dental model 502 to produce a dental aligner to be used to reposition one or more teeth of the user.

Referring now to FIG. 7, another embodiment of a fixture plate 700 is shown. The fixture plate 700 is configured to interface with and retain the dental model 502 using components the same as or similar to the fixture plate 100 described above. For example, the fixture plate 700 is shown to include a base 702, a bottom surface 704, and an upper surface 705 defining a contact face 706. The fixture plate 700 includes a cavity 708 similar to the cavity 108 of FIG. 1 and configured to receive an insert similar to the insert 200 shown in FIG. 2. Although positioned differently about the contact face 706, the fixture plate 700 comprises a bore 710 with a first opening (not shown) of the bore 710 at the bottom surface 704 of the fixture plate 700 and a second opening 712 at the upper surface of the fixture plate 700. The contact face 706 of the fixture plate 700 comprises a plurality of channels 714 and, although arranged in a different configuration about the contact face 706 than the plurality of channels 114 of the fixture plate 100, the plurality of channels 714 are disposed along the contact face 706 and are in fluid communication with the bottom surface 704 of the fixture plate 700 via the second opening 712 of the bore 710. An aperture 716 is disposed on the contact face 706 of the fixture plate 700, and the aperture 716 is configured to receive a protrusion (e.g., similar to the protrusion 117 of the fixture plate 100). The contact face 706 of the fixture plate 700 includes a channel 718 for insertion of an O-ring the same as or similar to the O-ring 400 of the fixture plate 100, and encompassing the dental model 502, the cavity 708, the channels 714, the aperture 716, recess 720 having a light absorbent material 722, and a viewing port 724.

In some embodiments, the contact face 706 of the fixture plate 700 includes a viewing port 724. The viewing port 724 may extend through the fixture plate 700 (e.g., similar to the bore 710). The viewing port 724 may include a transparent plastic, resin, or other type of material. The transparent material spans the viewing port 724. Hence, the viewing port 724 extends through the base 702 to the bottom surface 704. The viewing port 724 may provide for viewing a portion of the dental model 502 (e.g., from an underside of the fixture plate 700). In operation, a user and or a system (e.g. a positioning system, a cutting system, an image processing system, etc.) may view portions of the dental model 502 shown in FIG. 5 by pivoting, moving, or otherwise manipulating the fixture plate 700 to view a feature, such as the model identifier 522 or model identification code 524, through the viewing port 724.

The contact face 706 of the fixture plate 700 includes a recess 720 configured to receive a reflective, diffractive, or light absorbent material 722. The material 722 may be, for instance, a mirror configured to reflect light, a diffraction grating configured to diffract light in a direction away from the dental model 502, a light absorbent material configured to absorb light, and so forth. By way of example, where a laser is used for cutting a material 602 from the dental model 502 to produce a dental aligner, a laser cutting system which controls the laser may direct the laser toward the material 722. The material 722 may prevent the laser from inadvertently cutting portions of the dental model 502 or the material thermoformed thereon by reflecting or diffracting light from the laser away from the dental model 502 and the material thermoformed thereon, to absorb, deflect, or dissipate the light of the laser, and so forth. In some embodiments, the size, shape, and location of the recess 720 and the reflective material 722 may vary according to the size, shape, and configuration of the dental model 502 for which the fixture plate 700 is configured to retain so that the material 722 prevents inadvertent cutting of the dental model 502.

With regard to the fixture plate 100 and the fixture plate 700, it should be noted that the embodiments shown may be modified to accommodate various dental models 502 as well as cooperate with different systems. For example, the fixture plate 100 and the fixture plate 700 may be modified to have a pitched orientation. In such an embodiments, the upper surface 105, 705 of the fixture plate 100, 700 may be pitched such that the dental model 502 may be positioned at an angle (e.g., to present the dental model 502 to a cutting system) to facilitate cutting, trimming, and/or other processes. The fixture plate 100, 700 may have a pitched upper surface 105, 705 and a flat lower surface 104, 704. Further to the previous example, the upper surface 105, 705 may be modified such that the upper surface 105, 705 of the fixture plate 100, 700 is not substantially parallel to the bottom surface 104, 704 of the fixture plate 100, 700. Additionally, various components of the fixture plate 100 and the fixture plate 700 as shown may be positioned differently or removed to accommodate various dental models 502, systems, or equipment. The various components of the fixture plate 100 and the fixture plate 700 may also be combined with or removed from one another for the same or similar purposes.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "illustrative" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be X, Y, or Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods shown in the various exemplary embodiments are exemplary only. Additionally, any element disclosed in one embodiment may be incorporated or utilized with any other embodiment disclosed herein.

What is claimed is:

1. A fixture plate comprising:
    a base having a first surface and a second surface opposite the first surface, the second surface being a contact face configured to support a dental model having a model identifier on a bottom surface;
    a bore extending through the base from a first opening in the first surface to a second opening in the second surface, the first surface being in fluid communication with the second surface by the bore;
    one or more channels formed in the contact face and extending from the second opening;
    a viewing port extending through the base from the first surface to the second surface and having a transparent material inserted therein to seal the viewing port at the contact face, the viewing port and the transparent material enabling the model identifier to be accessed from underneath the contact face when the dental model is positioned on the contact face; and
    a protrusion extending from the contact face and being configured to interface with an aperture of the dental model to retain the dental model in a specific orientation on the contact face;
    wherein the one or more channels are configured to provide a suction force applied through the bore to hold the dental model against the contact face.

2. The fixture plate of claim 1, further comprising a reflective material arranged along the contact face of the base.

3. The fixture plate of claim 2, further comprising a recess formed in the contact face of the base, wherein the reflective material is disposed within the recess.

4. The fixture plate of claim 1, wherein the first opening is configured to couple with a hose of a vacuum system configured to generate the suction force.

5. The fixture plate of claim 4, wherein the hose is rotatably coupled with the first opening such that the base can rotate relative to the hose while maintaining the suction force.

6. The fixture plate of claim 4, further comprising an O-ring arranged on or partially within the second surface and surrounding an area of the contact face comprising the second opening and the one or more channels, the O-ring configured to provide a seal between the second surface of the base and at least one of the dental model and at least part of a material formed on the dental model.

7. The fixture plate of claim 1, wherein the transparent material comprises a plastic or a resin material.

8. The fixture plate of claim 1, wherein the protrusion comprises a pin and the aperture comprises a pinhole configured to receive the pin.

9. A system comprising:
a fixture plate configured to support a dental model having a material formed thereon and a model identifier on a bottom surface of the dental model, the fixture plate comprising:
a base having a first surface and a second surface opposite the first surface, the second surface being a contact face configured to support the dental model;
a bore extending through the base from a first opening in the first surface to a second opening in the second surface, the first surface being in fluid communication with the second surface by the bore;
one or more channels formed in the contact face and extending from the second opening, the one or more channels configured to provide a suction force applied through the bore to hold the dental model against the contact face in a specific orientation;
a viewing port extending through the base from the first surface to the second surface and having a transparent material inserted therein to seal the viewing port at the contact face, the viewing port and the transparent material enabling the model identifier to be accessed from underneath the contact face when the dental model is positioned on the contact face;
a first protrusion extending from the second surface of the base and configured to interface with a first aperture disposed on the dental model; and
a second protrusion extending from an insert positioned within a cavity formed in the contact surface, the second protrusion configured to interface with a second aperture of the dental model, wherein the first protrusion and the second protrusion are configured to retain the dental model in the specific orientation on the contact face.

10. The system of claim 9, wherein the second protrusion comprises a bar and the second aperture comprises a groove configured to receive the bar.

11. The system of claim 9, wherein the first protrusion comprises a pin and the first aperture comprises a pinhole configured to receive the pin.

12. The system of claim 9, further comprising a cutting tool configured to trim material thermoformed to the dental model positioned on the contact face to produce a dental aligner.

13. The system of claim 9, further comprising a recess formed in the contact face of the base, the recess configured to accommodate a reflective material.

14. The system of claim 9, wherein the first opening is configured to couple with a hose of a vacuum system configured to generate the suction force.

15. The system of claim 14, wherein the hose is rotatably coupled with the first opening such that the base can rotate relative to the hose while maintaining the suction force.

16. The system of claim 9, further comprising an O-ring arranged on or partially within the second surface and surrounding an area of the contact face comprising the second opening and the one or more channels, the O-ring configured to provide a seal between the second surface of the base and at least one of the dental model and at least part of the material formed on the dental model.

* * * * *